United States Patent [19]

Greco et al.

[11] Patent Number: 4,524,187

[45] Date of Patent: Jun. 18, 1985

[54] ISOBUTYLENE-TRIENE COPOLYMERS CROSS-LINKABLE UNDER AMBIENT HUMIDITY CONDITIONS, A PROCESS FOR THEIR PREPARATION, AND INTERMEDIATE SUITABLE FOR THIS PURPOSE

[75] Inventors: Alberto Greco, Dresano; Guglielmo Bertolini, Pavia; Omero Zavattini, Curtatone, all of Italy

[73] Assignees: Anic S.p.A., Palermo, Italy; Dow Corning Corporation, Midland, Mich.

[21] Appl. No.: 448,263

[22] Filed: Dec. 9, 1982

[30] Foreign Application Priority Data

Dec. 11, 1981 [IT] Italy .............................. 25517 A/81
Oct. 11, 1982 [IT] Italy .............................. 23702 A/82

[51] Int. Cl.³ .............................................. C08F 8/34
[52] U.S. Cl. ............................. 525/332.1; 525/332.8; 525/342
[58] Field of Search .................... 525/332.8, 332.1, 342

[56] References Cited

U.S. PATENT DOCUMENTS

| | | | |
|---|---|---|---|
| 2,833,749 | 5/1958 | Jones et al. ......................... | 525/342 |
| 3,344,067 | 9/1967 | Braunen et al. ................... | 525/332.8 |
| 3,408,420 | 10/1968 | Wiggill ............................... | 525/342 |
| 3,503,943 | 3/1970 | Kresge et al. ...................... | 525/342 |
| 3,720,654 | 3/1973 | Olechowski ...................... | 525/332.8 |
| 3,978,103 | 8/1976 | Meyer-Simon et al. ............ | 525/342 |
| 4,230,815 | 10/1980 | Itoh et al. ........................... | 525/342 |

*Primary Examiner*—Bernard Lipman
*Attorney, Agent, or Firm*—Hedman, Gibson, Costigan & Hoare

[57] ABSTRACT

Isobutylene copolymers, cross-linkable under ambient humidity conditions, characterized by the presence of pendant functions containing a silyl radical, are prepared by a process comprising the preliminary formation of new copolymers of isobutylene with a triene containing a system of two conjugate double bonds in position 1,3 and at least one other double bond of vinyl type, followed by the silylation of the polymers thus produced by means of a silicon derivative chosen from those of formula (I) or (II):

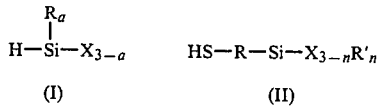

21 Claims, 2 Drawing Figures

ISOBUTYLENE-TRIENE COPOLYMERS CROSS-LINKABLE UNDER AMBIENT HUMIDITY CONDITIONS, A PROCESS FOR THEIR PREPARATION, AND INTERMEDIATE SUITABLE FOR THIS PURPOSE

This invention relates to new isobutylene polymers cross-linkable under ambient humidity conditions, prepared by a process comprising preliminary copolymerisation of isobutylene with a triene, followed by silylation of the resultant product. The final copolymers, which constitute the main subject matter of the invention, are characterised by the presence of pendant functions containing a silyl radical, and their preparation is made possible by the formation in the first stage of isobutylene and triene copolymers, the second important subject matter of the present invention, the basic characteristic of which is the presence of pendant groups of vinyl type.

The introduction of pendant vinyl groups into the polyisobutylene chains is known to be difficult.

In this respect, on copolymerising butylene with polyenes, these have a great tendency towards 1,4 polymerisation whenever they comprise a system of conjugate double bonds, with the result that double bonds of trans configuration are produced in the chain. On the other hand, when polymers such as 2-methyl-1,5-hexadiene are used, which in principle could give perfect vinyl functionality, these polyenes show low reactivity towards the isobutylene, and are only partly incorporated into the polymer chain (U.S. Pat. No. 2,384,975), because of which there is the problem of their recovery at the end of polymerisation. Moreover, such polyenes are products which are not available commercially, and are costly to synthesise. We have now found that it is possible to introduce vinyl groups into polyisobutylene by copolymerising the isobutylene (IB) with trienes which satisfy the general formula given heretofore, such as 5-methylhepta-1,3,6-triene (MET) or octa-1,3,7-triene (OT), by polymerising IB with the comonomer or mixture of comonomers in the presence of conventional cationic catalysts under the ordinary IB polymerisation conditions. By suitably choosing the copolymerisation conditions, it is possible to polymerise the triene to completion, thus avoiding complicated recovery operations, and it is also possible to produce constitutionally homogeneous copolymers of elastomer type, with narrow molecular weight distribution and a variable vinyl functionality content. These copolymers can be produced either of very high molecular weight, and as such are in the form of elastic solids almost free from tackiness, or of low molecular weight, and in which case have the appearance of highly tacky viscous fluids.

Copolymers of low molecular weight can be prepared by controlling the polymerisation temperature in particular, as it is known that in this case high temperatures favour the formation of low polymers, or by using chain transfer agents which have as their characteristic a limited poisoning effect on the polymerisation. A large number of these transfer agents is known, and they can be used in accordance with the methods of the art (Kennedy and Squires, J. Macromal Sc. chem. Al (6), 995 (1967)).

The copolymers containing vinyl pendant functions in the polymer skeleton, as stated, can be silylated by organic silicon compounds containing the silicon hydride function. The silylation reaction is generally accelerated by catalysts, the most effective of which is represented by solutions of chloroplatinic acid in alcohols (Speier catalyst), and causes the anti-Markovnikoff addition of hydrogen and the silyl radical to olefins in a practically quantitative manner. The reaction is highly specific and does not take place in the case of non-terminal olefins.

If a substituent sensitive to moisture is present in the silyl radical used in the silylation reaction, such as a hydride, alkoxy, acyloyl, thioalkoxy, phenoxy or amino radical, or a halogen etc., the silylated copolymer is sensitive to the ambient moisture and is therefore able to cross-link as a result of hydrolysis of the aforesaid groups or radicals, by condensation of the silanol groups originating from the hydrolysis, and the consequent formation of hydrolytically stable siloxane bonds between different molecular chains. This process is relatively easy, and can be accelerated by the presence of catalysts constituted generally by organic compounds and salts of heavy metals under normally present ambient temperature and humidity conditions.

In particular, the IB-OT and IB-MET copolymers, after silylation with organic silicon compounds containing hydrolysis-sensitive radicals, being materials cross-linkable under ambient humidity and temperature conditions, can be used as sealants, coverings or films, where the properties of the polyisobutylene elastomers are particular desirable, in particular low permeability to moisture, good adhesion and resistance to oxidation, and good electrical properties. The low tendency of polyisobutylene to oxidise, attributable equally to the absence of unsaturated bonds and the absence of tertiary carbons along the polymer chain, is also maintained in the IB-OT and IB-MET copolymers. In this respect, not more than one double bond of trans type is present in the main chain of these copolymers for each vinyl pendant function introduced, and cross-linking can take place when a very small number of silyl groups is present in the copolymer molecular. It is therefore sufficient to silylate from 0.2 to 2 mol % of vinyl groups, depending on the molecular weight of the copolymer, to render it cross-linkable. However, if desired, higher quantities of vinyl groups can be silylated in order to increase the cross-linking capacity of the copolymer. Moreover, if desired, the copolymer can contain non-silylated vinyl groups, it being generally preferable to minimise the residual unsaturated bonds of the copolymer.

The very low level of unsaturated bonds in the chain and the polyisobutylene skeleton give these copolymers characteristics which are superior to any other hydrocarbon polymer obtainable by silylation, and for example superior to the 1,2-modified polybutadiene claimed in U.S. Pat. No. 1,303,619 (Dow C.).

Even though IB-MET and IB-OT copolymers after silylation with silicon compounds containing radicals reactive to ambient humidity can basically be used as such in the presence only of the silanol condensation catalyst, it is generally preferable to use them in the form of mixtures. Suitable mixture components are silica in its various forms, alkaline earth metal carbonates, metal oxides, chain extenders, antioxidants, U.V. radiation absorbers, diluents etc., as suggested by experience of the art and the destination of the material.

Consequently, one subject matter of the present invention is represented by products of elastomer type cross-linkable under ambient humidity conditions, which are prepared by a process comprising preliminary copolymerisation of isobutylene with a triene, followed by silylation of the polymers produced in this manner.

The product of the silylation stage can subsequently be subjected to suitable compounding with silanol condensation catalysts and, optionally, with fillers, antioxidants, U.V. absorbers or diluents.

In particular, the compounds of the present invention are characterised by the presence of at least one pendant function of type (a) or (b)

(a)

(b)

where:
in group (a) R is a monovalent hydrocarbon radical containing from 1 to 10 carbon atoms, and X is halogen or an alkoxy, alkoxyalkoxy, phenoxy, thioalkoxy, acyloxy, amino, aminoxy, oxime or silanoxy radical, the group having a molecular weight variable between 1000 and 1,000,000, and a can be zero, 1 or 2;
in group (b) R is a bivalent hydrocarbon radical containing from 3 to 10 carbon atoms; R' is a monovalent hydrocarbon radical containing from 1 to 10 carbon atoms; X is halogen, or an alkoxy, alkoxyalkoxy, thioalkoxy, acyloxy, amino, aminoxy, oxime or amide radical; and n can be zero, 1 or 2.

As stated, the preparation of said functionalised copolymers is made possible by the synthesis, in a preliminary stage, of isobutylene copolymers containing pendant vinyl groups, said products deriving from the copolymerisation of isobutylene with a triene of general formula (III):

(III)

in which $R_1$, $R_2$, $R_3$, which can be the same or different, are hydrogen, or an alkyl, aryl, alkaryl, aralkyl or cycloalkyl radical, and B is an organic biradical. As anticipated, the use of 5-methylhepta-1,3,6-triene and octa-1,3,7-triene has proved particularly interesting. The conjugate bonds can also pertain to a cycle.

The isobutylene-triene copolymers are characterised by the presence of vinyl chains, of which the concentration can vary from 0.1 to 30% of the molecular weight of the polymer by weight.

The process is described in detail hereinafter in terms of the aforesaid stages:

(a) Synthesis of vinylated polyisobutylene

The vinylated polyisobutylene can be prepared, as stated, by cationic polymerisation of isobutylene with a triene or mixture of trienes, using catalysts of the Lewis acid type, either in the presence or absence of a solvent.

The cationic catalyst can be $AlCl_3$, added preferably in the form of its solution in methylchloride or ethylchloride. However, other systems can be used such as $AlEtCl_2$, $BF_3$, activated $MgCl_2$, $SnCl_4$, $TiCl_4$ etc., either alone or in the presence of activators such as water, hydrochloric acid, halogens, alkylhalides etc. The catalyst, either as such or in solution, can be added to the mixture of monomers, or to one of their solutions, either completely at the commencement of polymerisation or in small portions during the course of the polymerisation. At the end of polymerisation, the catalyst can be deactivated either by stripping with steam or by adding a small quantity of alcohols.

After deactivating the catalyst, the polymer or its solution can be purified to free it from the catalytic residues. One of these purification systems consists of washing with aqueous hydrochloric acid, but other systems could function equally well.

The polymerisation temperature generally lies between 0° C. and −100° C., even though these limits are not necessarily rigid. The higher temperature favours the formation of polymers of low molecular weight.

If polymers of particularly low molecular weight are desired, for example of MW≦5000 and viscosity at 25° C.≦200,000 cp, it can be advantageous to use chain transfer agents. These transfer agents generally consist of organic halides or olefins. These include t-butylchloride, allylchloride, allylbromide, cyclopentadiene, isooctene, indene etc. If used, the polymerisation solvents are preferably chosen from hydrocarbons, which can also be partly or completely halogenated. These include pentane, isopentane, hexane, kerosene, methylchloride, ethylchloride, methylenechloride, carbon tetrachloride, chlorobenzene etc., either pure or in mixture with each other.

The monomer concentration can be varied within wide limits in the solvent, generally between 1 and 50% by volume. The MET and OT, i.e. the trienes which as stated are preferably used in the copolymerisation, were purified and used at high purity (≧98%), however the presence of small quantities of their isomers is well tolerated. They can be added either together with the isobutylene at the beginning of the test, or added in portions during the course of it. The polymerisation was generally conducted in such a manner that the MET or OT was entirely consumed. Copolymers of differing degrees of total vinylation are obtained, depending on the IB/MET or IB/OT ratio, and the polymerisation conditions.

(b) Silylation

The isobutylene-triene copolymers can be used for the silylation reaction either as such, or in the solutions originating directly from the polymerisation, or freed of the catalytic residues by purification (acid wash etc.). The isobutylene-triene copolymers are silylated either with an organic silicon compound, such as a silicon hydride of general formula (I)

(I)

in which
R is a monovalent hydrocarbon radical of 1 to 10 carbon atoms
X is halogen or an alkoxy, alkoxyalkoxy, phenoxy, thioalkoxy, acyloxy, amino, aminoxy, oxime or silanoxy radical
a can be zero, 1 or 2
or with a thiol of general formula (III)

(II)

in which

R is a bivalent hydrocarbon radical of 3 to 10 carbon atoms

R' is a monovalent radical of 1 to 10 carbon atoms

X is halogen, or an alkoxy, alkoxyalkoxy, thioalkoxy, acyloxy, amino, aminoxy, oxime or amide radical n can be zero, 1 or 2.

The silylation with compounds of general formula (I) is carried out in the presence of a catalyst constituted by soluble transition metal compounds, or metals in a finely divided state on supports, or peroxides. A solution of $H_2PtCl_6.6H_2O$ in alcohol, such as isopropanol, octanol etc., is particularly convenient. The silylation is carried out generally in inert solvents such as those of hydrocarbon type including aromatic, or of ether type at a temperature of between ambient and 200° C.

Temperatures of between +50° and +120° C. are generally preferred. For low viscosity polymers, for example of viscosity 10,000 Cp, the use of the solvent can be omitted.

The most common silylating agents are $HSiCl_3$, $HMeSiCl_2$, $HMe_2SiCl$.

When the silylating agent used is chosen from these latter compounds or from others which while satisfying the general formula comprise hydrolysable halogens, it is necessary to remove the halogen from the polymers. This is generally done by treating the polymers or their solutions, after removing any excess or unreacted silylating agent, with a slight excess of alcohol (methanol, ethanol etc.) or with some other proton donor (acetic acid).

The hydrochloric acid formed by interaction between the proton donor and the polymer containing hydrolytically unstable chlorines must be removed, and this can be done by purging the polymer or its solutions with a stream of dry nitrogen. The last traces of acidity can be eliminated using basic substances or small quantities of cyclic ethers. Finally, any solvent present and the excess of alcohol are removed under vacuum.

The thiols of general formula (II) are added to the isobutylene-triene copolymers either in solution or in mass, using radical or ionic catalysts, redox systems, U.V. radiation, or by the simple action of heat, following methods generally used for adding thiols to olefins.

When the thiol is added to the unsaturated bonds of the isobutylene-copolymer radically with the aid of a catalyst, initiators can be used consisting of organic molecules able to generate radicals by thermal decomposition, or redox systems.

Of the organic molecules able to generate active radicals, the azocompounds and organic peroxides and hydroperoxides are of particular importance, in particular azocompounds such as azobisisobutyronitrile, which are known not to appreciably degrade butyl rubber. If an ionic initiator is used, it can be chosen preferably from ammonium or phosphonium hydroxides or similar systems.

Tetrabutylammonium hydroxide or tetrabutylphosphonium hydroxide are particularly suitable for this purpose. In effect, systems of this type have the advantage of decomposing at a higher temperature than those required for catalytic use, and can therefore be decomposed in situ when the reaction is terminated, to generate neutral products.

The presence of neutral products in the copolymers functionalised in this manner is particularly desirable, in that it is well known that both basic and acid substances can accelerate the silanol condensation process in an undesirable manner, and thus reduce the pot stability of said functionalised copolymers. The problem obviously does not exist when the thiol is added to the isobutylene-triene copolymers by means of U.V. When the thiol is added to the isobutylene-triene copolymers in solution, the optimum conditions are those which enable the reaction to be maintained homogeneous, and specifically the solvent must be such as to properly dissolve not only the polymer and the thiol containing the reactive silicic function, but also the initiator, and in addition must not prejudice the life of this latter.

If the initiator is for example an azocompound or a peroxide, either aromatic or aliphatic hydrocarbon solvents have proved particularly suitable.

If the polymer is dissolved in one of these solvents, a concentrated solution of the initiator dissolved in a more suitable solvent can be added thereto. Thus, hydroperoxides, tetraalkylammonium hydroxides or tetraalkylphosphonium hydroxides can be added to the hydrocarbon polymer solutions in concentrated solutions of alcohol or other polar solvents. When the thiol is added to the isobutylene-triene copolymer in mass, it is obviously preferable to add the initiator, in the form of a concentrated solution in an appropriate solvent, to a homogeneous mixture of the thiol with the isobutylene-triene copolymer, prepared for example by means of a Banbury apparatus.

Alternatively, the initiator can be added pure, in the form of liquid or fine powder.

The addition of the thiol to the double bonds promoted by the initiators pertaining to the stated classes is a non-selective reaction, which takes place both at the non-terminal double bonds and at the vinyl bonds.

However, infrared evidence suggests that at least in our case, addition to the vinyl is generally preferred. From this aspect, the isobutylene/1,3,7-octatriene and isobutylene/5-methyl-1,3,6-heptatriene copolymers previously claimed by us represent an excellnt substrate.

The efficiency of the reaction depends obviously on the relative concentrations of thiol/isobutylene-triene copolymer, on the concentration of the initiator and its relative force, and on the temperature.

From the practical aspect, when the thiol is added to the isobutylene-triene copolymer in solution, it is well to operate in the most suitable solvent (see the aforegoing) at the maximum possible polymer concentration, i.e. that at which it is still sufficiently mobile to allow effective agitation. The operating temperature is generally chosen within the range in which the half life of the radical, ionic or redox initiator is sufficiently long to enable the reaction to proceed in the best manner.

The thiol concentration can be calculated at the stoichiometric, as determined partly by the content of vinyl bonds or of non-terminal double bonds, but it can equally well be used in deficiency or in excess, depending on the final properties required of the polymer.

In conclusion, it can be stated that in the case of an ideal isobutylene-triene copolymer, i.e. with a M.W. variable between 1000 and 100,000, and a triene content of 0.5–10 mol % as double bonds, the thiol can be added in the proportion of 10 to 500 mol % per mole of triene present in the copolymer as double bonds, and using a quantity of initiator of 0.01 to 3% by weight of the copolymer, whether it is of radical, ionic or redox system type.

This latter problem obviously does not exist when ultraviolet radiation is used.

Non-limiting examples of these compounds are:
γ-mercaptopropyl-trimethoxysilane

γ-mercaptopropyl-triethoxysilane.

(c) Compounding

After silylation and any treatment described under point (b), the polymers are able to cross-link under ambient humidity conditions, however the rate of cross-linking can be increased by using condensation catalysts for the silanol groups. These are organic or inorganic compounds of heavy metals such as dibutyltin dilaurate, tin octylate, dibutyltin oxide, lead cyclohexanebutyrate, certain metal alkoxides such as titanium tetrabutylate, amines such as butylamine 2 hexanoate, or a variety of acid and basic catalysts. In general, the amount of cross-linking accelerators added varies between 0.01 and 10% of the polymer by weight.

After adding these catalysts, the claimed polymers cross-link in a period of between one day and one week when exposed to normal ambient conditions, i.e. around 20° C. with a relative humidity of between 30 and 70%. During the cross-linking stage, a surface film is firstly formed, after which cross-linking takes place in depth, with the original tackiness being lost.

Mineral fillers, which can be chemically inert or partially reactive towards the polymers can be added to these latter. Such fillers include silica in all its forms, including quartz powder or combined as in diatomaceous earths, clays or natural or synthetic zeolites, certain alkaline or alkaline earth carbonates, certain oxides such as $TiO_2$, $Fe_2O_3$, pigments, carbon black, antioxidants, ultraviolet light absorbers etc. When the thiols of formula (II) are added to the isobutylenetriene copolymers, these latter are able to cross-link by exposure to ambient humidity by condensation of the silanol groups bonded to the silicon (X) by virtue of the ambient moisture.

X of formula (II) is preferably a neutral group, and in addition the condensation of the silanols can be accelerated by the presence of catalysts.

This process is relatively easy, and can be accelerated by the presence of catalysts constituted in general by organic compounds and salts of heavy metals under normal ambient temperature and humidity conditions.

Such copolymers can be used as sealants, coverings or films, where the properties of the polyisobutylene elastomers are particularly desirable, in particular their low moisture permeability, good adhesion and resistance to oxidation, and good electrical properties.

The poor tendency of polyisobutylene to oxidise is also maintained in the functionalised copolymers. The following examples are given to illustrate the present invention.

EXAMPLE 1

Isobutene/octa-1,3,7-triene (OT) copolymerisation. Purified isobutylene (40 ml) and anhydrous ethylchloride (100 ml) were condensed at −40° C. in a previously dried and dry nitrogen-purged glass reactor provided with an agitator, thermometer and dropping funnel, after which tert-butylchloride (3.1 ml, 28 mmoles) as chain transfer agent, and OT (4 ml) were added.

A solution of pure $AlCl_3$ (0.26 g, 2 mmoles) in ethylchloride (9 ml) was fed into the dropping funnel and maintained at −40° C. Polymerisation was started by dripping the $AlCl_3$ solution very slowly into the reactor, in which the solution of the various reagents was kept in effective agitation at −40° C. over about 8 minutes, the temperature variations being contained to within ±5° C. During this time, OT was added to the polymerisation solution in two portions of 3 ml each, after 4 and 8 minutes.

The polymerisation was blocked by adding ammoniacal methanol (5 ml).

After freeing the polymer of the ethylchloride, it was taken up in pentane, washed carefully firstly with aqueous hydrochloric acid and then with water until neutral, and was finally dried under vacuum at 90° C. 29 g of copolymer were obtained, having the following characteristics: Viscosity 25° C. 21,000 Cp, tg −55, $MW/M_n$ 1.6, U 30.5, U/A 1.4 where U represents the utilisation of the monomer, and is given by the percentage ratio of the triene fraction effectively copolymerised to give vinyl groups (calculated on the absorption at 10.9μ of the infrared spectrum) to the fraction consumed during copolymerisation, and A represents the triene fraction copolymerised to give trans double bonds (calculated on the absorption at 10.3μ of the infrared spectrum), so that U/A expresses the ratio of vinyl double bonds to trans double bonds.

These symbols are used in the subsequent examples.

EXAMPLE 2

Isobutene/5-methylhepta-1,3,6-triene (MET) copolymerisation. The polymerisation was carried out under the exact conditions of Example 1, but replacing OT by an equal volume of MET. In this case 34 g of polymer were obtained, having the following characteristics:

Viscosity 25° C. 29,000 Cp, tg −56, $MW/M_n$ 1.5, U 32, U/A 0.95.

EXAMPLE 3

The polymerisation was carried out respecting the experimental conditions of Example 1 except that the temperature was maintained at −30° C., and starting with the following reagents:
$AlCl_3$: 0.133 g, 1 mmole
Isobutene 40 ml
Ethylchloride 100 ml
Tert-butylchloride 28 mmoles
MET 5 ml.

Under these conditions, 24 g of copolymer were obtained with viscosity at 25° C. of 19,000 cp, $MW/M_n$ 1.45, U 25, U/A 0.73.

EXAMPLE 4

Polymerisation was carried out under the experimental conditions of Example 1 and the temperature of Example 3, starting from the following reagents in the quantities indicated:
$AlCl_3$: 0.390 g (3 mmoles)
Isobutene 40 ml
Ethylchloride 100 ml
α-diisobutylene 28 mmoles
MET 5 ml 23 g of copolymer were obtained having a viscosity at 25° C. of 43,200 cp, $MW/M_n$ 1.5, U 26, U/A 1.06.

EXAMPLES 5–8

Isobutylene-OT copolymerisation in pentane.

These polymerisation tests were carried out respecting the conditions of Example 1 overall, but adding the triene all at the commencement of polymerisation, which was extended for 15 minutes.
$AlCl_3$ 0.26 g, 2 mmoles
Isobutene 40 ml
OT 3 ml, equal to 2.45 g n-pentane 100 ml

| Test No. | Polymerisation temperature °C. | Yield g | U | $\frac{U}{A}$ | tg °C. |
|---|---|---|---|---|---|
| 5 | −100 | 20 | 74 | 1.6 | — |
| 6 | −60 | 23 | 60 | 1.5 | −61 |
| 7 | −30 | 23 | 46 | 1.8 | −61 |
| 8 | −10 | 23 | 37 | 1.6 | −59 |

EXAMPLES 9–12

Isobutene-OT copolymerisation in ethylchloride.

This series of tests was carried out in a manner perfectly identical to that of Examples 5–8, but replacing the n-pentane solvent with ethylchloride (100 ml).

| Test No. | Polymerisation temperature °C. | Yield g | U | $\frac{U}{A}$ | Visc. 25° C. | tg °C. |
|---|---|---|---|---|---|---|
| 9  | −100 | 30 | 82 | 1.8  | —      | —   |
| 10 | −60  | 32 | 68 | 1.8  | —      | −62 |
| 11 | −30  | 28 | 46 | 1.8  | —      | −60 |
| 12 | −10  | 19 | 25 | 1.65 | 66,000 | −62 |

EXAMPLES 13–17

Isobutylene-MET copolymers.

These were prepared under the conditions described for Examples 5–8, but in this case the OT was replaced by an identical quantity of MET.

| Test No. | Polymerisation temperature °C. | Yield g | U | $\frac{U}{A}$ | Visc. 25° C. | tg °C. |
|---|---|---|---|---|---|---|
| 13 | −100 | 22 | 83 | 1.7  | —       | —   |
| 14 | −60  | 24 | 55 | 1.4  | —       | −64 |
| 15 | −30  | 25 | 49 | 1.3  | —       | −58 |
| 16 | −10  | 15 | 24 | 0.7  | —       | −62 |
| 17 | 0    | 23 | 18 | 1.03 | 204,000 | —   |

EXAMPLE 18

Silylation of the polymer described in Example 1.

The polymer of Ex. 1 (20 g) was dissolved in anhydrous toluene (80 ml). A large excess of trichlorosilane (10 ml) and a trace of $H_2Pt\,Cl_6$ dissolved in isopropanol were added to the solution.

The solution was agitated vigorously in a closed vessel at 80° C. for 4 hours. At the end of this period, the solution was cooled to ambient temperature, and the unreacted trichlorosilane removed under vacuum. At this point, a small sample of the solution was coagulated in methanol and the polymer was made into a film by carbon disulphide and subjected to infrared spectroscopy to show that the band at 10.9μ representing vinyl groups had completely disappeared.

The solution deriving from the silylation was made up to 100 ml with a small quantity of toluene (10–20 ml), and then absolute ethanol (15 ml) was added drop by drop at ambient temperature. The hydrochloric acid evolved during the operation was removed by blowing dry nitrogen into the solution.

After 1 hour of effective agitation, the polymer was freed of the unreacted ethanol and toluene under vacuum at 50° C. The operation was considered complete when the polymer lost no further weight when subjected to vacuum.

A portion of this polymer was treated with 1% by weight of dibutyltin laurate, placed on an aluminium foil to give a film a couple of millimeters thick, and then exposed to ambient temperature and humidity, after which it demonstrated complete cross-linking in 5–7 days.

EXAMPLE 19

Hydrosylation of the copolymer described in Example 3.

The copolymer of Example 3 was completely hydrosylated under the conditions of Example 17, and subjected to the same alcoholysis treatment.

Dibutyltin laurate (1% by weight), methyltriethoxysilane (10% by weight) and amorphous silica (10% by weight) were added to a portion of the thus modified polymer. This compound, when distributed on a water surface to a thickness of about 1 millimeter was completely free from tackiness after 2–4 days of exposure to the environment.

EXAMPLE 20

Preparation of IB-MET copolymer with degree of polymerisation (MW) of $50-100 \times 10^3$.

Operating under the conditions described in Examples 9–12 and starting with the following reagent quantities:

$AlCl_3$ 0.26 g (2 mmoles)
Isobutene 40 ml
MET 2 ml
Ethylchloride 100 ml the polymerisation was carried out at −80° C. for 12 minutes, after which it was blocked with 15 ml of methanol and the solution coagulated in a large excess of methanol, to give an IB-MET copolymer (28 g) which after drying in an oven at 70° C. until constant weight showed the following characteristics:

Vinyl content (% MET by weight in copolymer) 4.19
Vinyls/trans 2.0
$M_n$ 19,400
$MW/M_n$ 4.95
tg (°C.) −62

EXAMPLES 21–27

Preparation of IB-MET copolymers with degree of polymerisation (MW) of $50-100 \times 10^3$.

Operating with the same reagent quantities but carrying out the polymerisation at −75° C. and in two cases varying the MET quantities (Ex. 27, 28), the polymers with the yields and characteristics indicated in Table 1 were obtained. Some of these examples (21–26) were carried out for the main purpose of verifying the polymerisation test reproducibility.

EXAMPLE 28

Hydrosylation of the IB-MET copolymer of MW $50-100 \times 10^3$ with trichlorosilane.

The IB-MET copolymer of Example 20 (15 g) was dissolved in anhydrous toluene (70 ml) in a test tube of 250 ml capacity which would be hermetically sealed when required. Toluene (20 ml) was stripped from the container by vacuum in order to degas the solution and remove the final traces of moisture.

After filling the reactor with dry nitrogen and fitting a magnetic bar agitator, trichlorosilane (3 ml) and chloroplatinic acid (0.004 g) in an isopropanol solution were added. The test tube was hermetically sealed, and the copolymer solution vigorously agitated for 5 hours at 100° C., after which it was cooled to 40° C., and the unreacted trichlorosilane together with part of the toluene (10 ml) was removed by vacuum.

After restoring the inert gas atmosphere in the test tube, absolute ethanol (4 ml) was added carefully in the form of droplets under agitation at 40° C.

After adding the ethanol, a stream of nitrogen was passed slowly through the solution while keeping it in agitation at 40° C. After 2-3 hours, a large proportion of the hydrochloric acid evolved during the alcoholysis had been removed, and the solution was again stripped under vacuum to eliminate a further quantity of toluene (5-7 ml).

Dry nitrogen was again fed into the test tube, and dibutyltin dilaurate (1% by weight of the polymer) was added to the solution (40 ml). After this treatment, the solution was poured into open containers so that after the solvent evaporated, it left a polymer film 0.5 mm thick. After one month of exposure to ambient humidity, the film showed the following characteristics:
gelled material (% by weight) 91
Tensile strength kg/cm² 3.3
Elongation at break 210%

EXAMPLE 29

Silylation of IB-MET copolymer with trichlorosilane.

An equal weight mixture of the IB-MET copolymers of Examples 21 and 22 (15 g) was silylated with trichlorosilane, and after silylation was treated with alcohol by the method and using the same reagent quantities stated in Example 28. A film of copolymer treated in this manner showed the following characteristics after exposure for 3 weeks to ambient humidity:
gel content (% by weight) 85
Tensile strength kg/cm² 4.7
Elongation at break 135%

EXAMPLE 30

Silylation of IB-MET copolymer with methyldichlorosilane.

The experiment described in Example 29 was repeated exactly on the same equal weight mixture of copolymers, but replacing the trichlorosilane by methyldichlorosilane (3.5 ml). After alcoholysis with ethanol by the already described method (Example 28), a film of this copolymer showed the following characteristics after exposure to ambient humidity for 3 weeks:
gel content (% by weight) 91
Tensile strength kg/cm² 5.2
modulus at 100% elongation 4.8
Elongation at break 130%
Hardness (Shore A) 25.

EXAMPLE 31

Silylation of IB-MET copolymer with dimethylchlorosilane.

An equal weight mixture of the IB-MET copolymers of Examples 23 and 24 was silylated under the conditions of Example 28, but replacing the trichlorosilane by dimethylchlorosilane (3.5 ml).

Figure 1:
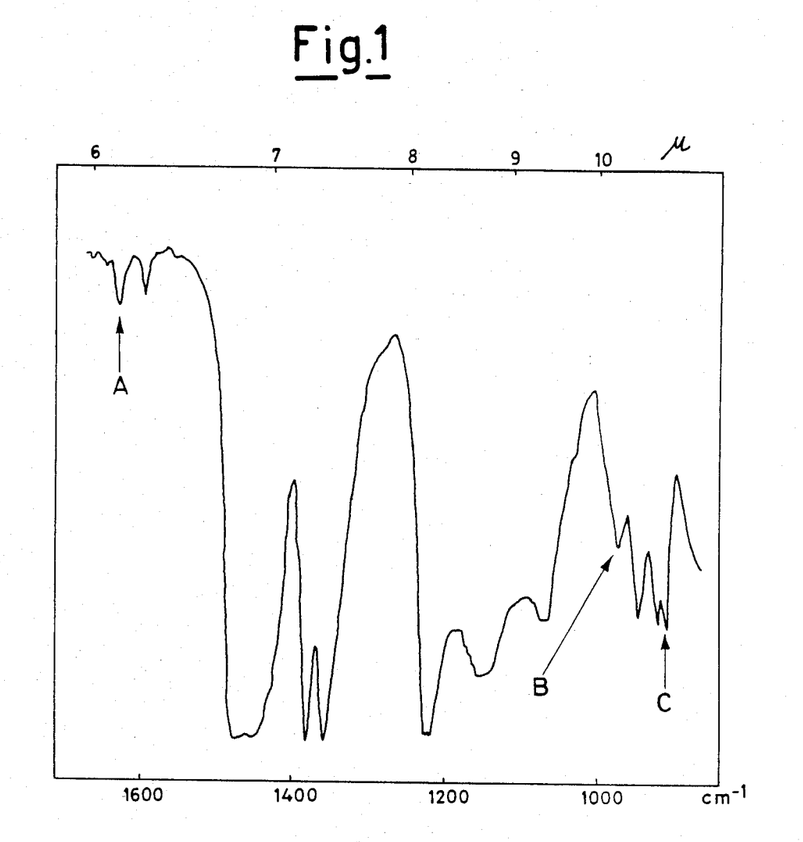
FIG. 1: This is an IB-MET copolymer as such. Band A represents a vinyl double bond, band B the trans double bond, and band C a vinyl double bond.
Figure 2:
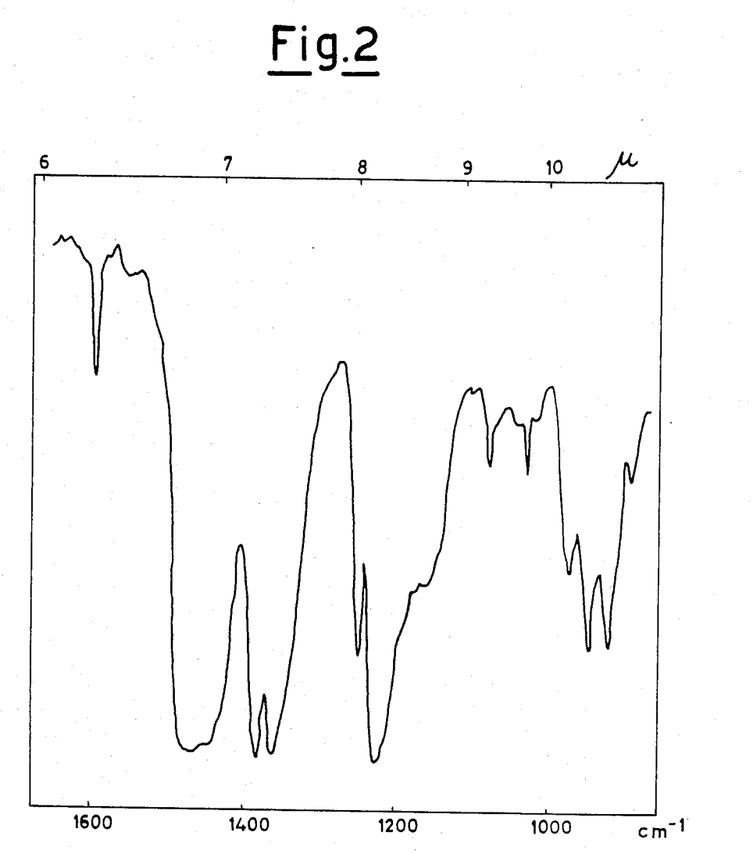
FIG. 2: This is the IB-MET copolymer after silylation with $HMeSiCl_2$.

As in the preceding cases, the silylation was not less than 70% in terms of efficiency, and was highly selective towards the vinyl as shown by the accompanying infrared spectra (FIGS. 1 and 2), in which the bands relating to the vinyl double bond at 6.1 and 10.9μ have totally disappeared, whereas the band at 10.3 relating to the trans double bonds is unaltered. After alcoholysis and treatment as described in Example 28 onwards, this copolymer also cross-linked under ambient humidity conditions (75% by weight of gelled material after 3 weeks of exposure to ambient humidity).

With reference to the aforesaid spectra, the Figures represent the following.

EXAMPLE 32

Silylation of IB-MET copolymer with trichlorosilane.

The IB-MET copolymer of Example 27 (15 g) was silylated under the conditions described in Example 27, but in this case using only 1.5 ml of trichlorosilane. After ethanolysis of the silylated copolymer, a film of this material deposited by toluene showed the following characteristics after 1 week of exposure to ambient humidity:
breaking load 4.2 kg/cm²
ultimate elongation 150%.

EXAMPLE 33

An equal weight mixture of the copolymers described in Examples 23–24 (15 g) was silylated with trichlorosilane (0.7 ml) at 130° C. for 10 hours by the method described heretofore. Infrared examination of the copolymer showed that only part of the vinyl groups had been silylated after this time (approximately 50–60%).

After ethanolysis, a film of this polymer deposited by toluene showed the following characteristics after 3 weeks:
breaking load 3.2 kg/cm²
ultimate elongation 310%.

TABLE

| Ex. No. | MET (ml) | Polymer yield (g) | Vinyls as MET (% wt) in copolymer | Vinyls trans | $M_n$ | $\frac{MW}{M_n}$ | tg (°C.) |
|---|---|---|---|---|---|---|---|
| 21 | 2 | 25 | 3.6 | 1.7 | 18,800 | 3.8 | n.d. |
| 22 | 2 | 26 | 4.4 | 2.0 | 21,000 | 3.3 | −62 |
| 23 | 2 | 25 | 5.1 | 2.5 | 20,600 | 3.6 | n.d. |
| 24 | 2 | 24.5 | 4.9 | 2.1 | 14,100 | 4.7 | n.d. |
| 25 | 2 | 27 | n.d. | n.d. | 16,700 | 4.2 | n.d. |
| 26 | 1.2 | 27 | 3.4 | 2.1 | 18,500 | 4.6 | −62 |
| 27 | 4 | 22 | 8.1 | 2.2 | 20,000 | 2.7 | −61 |

INTRODUCTION TO EXAMPLES 34–49

Vinylated polyisobutylenes prepared by the described method were grafted with γ-mercaptopropyltrimethoxysilane (MPTS) in accordance with the procedures described hereinafter by way of example.

In the examples, the trans content and vinyl content indicate the weight % of 5-methyl-1,3,6-heptatriene (MET) contained in the copolymer with isobutylene (IB), calculated with respect to the trans double bonds and vinyl double bonds respectively, taking it for granted that each MET unit contributes at least one vinyl double bond to the copolymer.

The grafting reactions were carried out on the copolymers in toluene solution, with a solids concentration of 30% by weight, with 10 g of copolymer in hermetically sealed test tubes. The reagent quantities (MPTS and initiator) are expressed as % by weight of the IB-MET polymer quantity used.

EXAMPLE 34

Bis-azobisisobutyronitrile (AIBN) (0.25%) was added to a toluene solution of IB-MET copolymer of the following characteristics:

| | |
|---|---|
| MET content calculated as vinyls | 2.68 |
| MET content calculated as trans double bonds | 1.53 |
| $M_n$ | 16,500 |
| $\dfrac{MW}{M_n}$ | 3.2 |

The solution was vigorously agitated at 70° C. for 6 hours, and then at 80° C. for 14 hours.

At this point, an i.r. examination showed that the bands at 10.35 and 10.4$\mu$ were reduced in intensity compared with the original copolymers.

Further AIBN (0.1%) was added, and agitation continued for a further 14 hours at 80° C.

This second operation led to no appreciable variation in the said i.r. spectrum bands.

A polymer film obtained from this solution after adding diisobutyltin dilaurate (SDBL) showed the following characteristics after exposure to ambient humidity (50% relative humidity, ambient temperature, 20 days):
gel (% by weight) 60
breaking load 1.5 kg/cm$^2$
elongation 150%.

EXAMPLES 35–40

In these examples, the MPTS was grafted on a copolymer of the following characteristics:

| | |
|---|---|
| MET content as vinyls | 4.05 |
| MET content as trans double bonds | 2.16 |
| $M_n$ | 11,400 |
| $\dfrac{MW}{M_n}$ | 5.84 |

With reference to the following table, in treatment (A) the grafting was carried out at 60° C. for 3 hours, at 70° C. for 1.5 hours, at 80° C. for 1 hour and at 90° C. for 0.5 hours, whereas in treatment (B) the grafting was carried out at 40° C. for 4 hours, at 60° C. for 7 hours and at 100° C. for 1 hour. The gel and mechanical properties were determined on polymer films obtained from their solutions after adding SDBL (0.1% of the polymer), and exposing to moisture for 48 hours at 65° C. under 70% relative humidity. In the case of the asterisked samples, SDBL was not added.

| Ex. No. | MPTS % | AIBN % | Type of treatment | gel % | Breaking load kg/cm$^2$ | Elong. % |
|---|---|---|---|---|---|---|
| 35 | 5 | 0.3 | A | 56.5 | — | — |
| 36* | 7.6 | 0.6 | A | 51 | — | — |
| 37* | 11.5 | 0.6 | A | 57 | — | — |
| 38 | 11.5 | 0.7 | B | 73.1 | 1.8 | 175 |
| 39 | 23 | 0.3 | A | 87.6 | 3.64 | 54 |
| 40 | 23 | 0.7 | A | 91.9 | — | — |

EXAMPLE 41

A toluene solution of the same copolymer as in Examples 35–40 was grafted with MPTS (7.6%) using (n.butyl)$_4$NOH (0.3%) added in the form of an alcoholic solution as initiator. Grafting was carried out at 60° C. for 2 hours. A film of this copolymer obtained from the solution after adding SDBL (0.1%) gave 42.5% of gel after exposure to moisture under the conditions described in Examples 35–40.

EXAMPLE 42

A toluene solution of the IB-MET copolymer used in Examples 35–40 was grafted with MPTS in the same proportions as Example 4, using (n.butyl)$_4$POH (0.3%) in the form of an alcoholic solution as initiator, while maintaining the solution at 100° C. for 7 hours.

After adding SDBL (0.1%), a film of this copolymer showed the following characteristics on exposure to ambient humidity (50% relative humidity, 3 weeks of ambient temperature):
gel 74%
breaking load 2.6 kg/cm$^2$
Elongation 120%

EXAMPLE 43

A toluene solution of the IB-MET copolymer of Examples 35–40 was grafted with MPTS (11.5% by U.V. radiation with a 400 Watt lamp) in a quartz test tube for 6 hours at ambient temperature. A polymer film obtained from its solution after adding SDBL (0.1%) gave 71.9% of gel on exposure to moisture under the conditions indicated in Examples 35–40.

EXAMPLES 44–47

For this series of experiments, two different IB-MET copolymers of the following characteristics were used:

| | Copolymer 1 | Copolymer 2 |
|---|---|---|
| MET content as vinyls | 8.29 | 9.7 |
| MET content as trans double bonds | 4.00 | 5.37 |
| $M_n$ | 24,000 | 15,000 |
| $\dfrac{MW}{M_n}$ | 3.4 | 4.4 |

Grafting with MPTS was carried out using the ionic initiators specified below, agitating the solutions vigorously at 100° C. for 7 hours.

The gel content was determined in a copolymer film obtained from the solutions after adding SDBL (0.1%)

| Ex. No. | Co-poly-mer type | MPTS | Initiator Type | % | Gel % | Breaking load | Elong. % |
|---|---|---|---|---|---|---|---|
| 44 | 1 | 8.7 | (nbut)₄NOH | 0.7 | 45.3 | — | — |
| 45 | 1 | 8.7 | (nbut)₄POH | 0.7 | 68.4 | 3.2 | 150 |
| 46 | 11 | 3 | (nbut)₄POH | 0.3 | 30.0 | — | — |
| 47 | 11 | 5 | (nbut)₄POH | 0.3 | 46.0 | — | — |

EXAMPLE 48

An IB-MET copolymer of the following characteristics:

| | |
|---|---|
| MET content as vinyls | 3.54 |
| MET content as trans double bonds | 1.72 |
| $M_n$ | 54,600 |
| $\dfrac{MW}{M_n}$ | 9.98 | in a toluene solution (7% solids) was grafted with MPTS (5%) under the following conditions: 70° C. for 7 hours, 90° C. for 8 hours, 110° C. for 8 hours, in the presence of AIBN (0.6%). A polymer film obtained from its solution after adding SDBL (0.1%) showed the following properties on exposure to moisture under the conditions of Examples 35–40:
gel 82%
breaking load 9.5 kg/cm²
elongation 220%.

EXAMPLE 49

A commercial IB-isoprene copolymer (isoprene content 2 mol %, $M_n$ 150,300, MW/$M_n$ 3.91) was grafted with MPTS using the reagents, relative quantities and reaction conditions indicated in Example 48.

A copolymer film obtained under the same conditions as Example 48 gave 30% of gel.

We claim:

1. Copolymers of isobutylene and at least one triene selected from the group consisting of 1,3,7-octatriene, 5-methyl-1,3,6-heptatriene, hexatriene, dicyclopentadiene and allylcyclopentadiene, of molecular weight variable between 1000 and 1,000,000 and cross-linkable under ambient humidity conditions, characterised by the presence of pendant functions of type where R is a monovalent hydrocarbon radical of 1 to 10 carbon atoms, X is halogen or an alkoxy, phenoxy, thioalkoxy, acyloxy, amino, aminoxy, oxime or silanoxy radical, and a is 0, 1 or 2 wherein the silicon atoms are bonded to the copolymer through reaction with the non-terminal double bond or the vinyl bond on said triene.

2. Copolymers as claimed in claim 1, wherein the triene is chosen from those of formula where $R_1$, $R_2$ and $R_3$, which are the same or different, can be hydrogen, or an alkyl, aryl, alkylaryl, arylalkyl or cycloalkyl radical, and B is a bivalent organic radical.

3. Copolymers as claimed in claim 2, characterised by a concentration of vinyl chains which may vary from 0.1 to 30% by weight of the polymer.

4. A process for preparing isobutylene polymers as claimed in claim 3, comprising the preliminary copolymerisation of isobutylene with said triene followed by silylation of the resultant product with a silicon compound of 5. A process for preparing isobutylene polymers as claimed in claim 4, wherein the preliminary copolymerisation of isobutylene with the triene is carried out in the presence of a cationic catalyst.

6. A process for preparing isobutylene polymers as claimed in claim 4, wherein the preliminary copolymerisation of isobutylene with the triene is carried out in the presence of a solvent chosen from hydrocarbons, either as such or halogenated, or mixtures thereof.

7. A process for preparing isobutylene polymers as claimed in claim 4, wherein the preliminary copolymerisation of isobutylene with the triene is carried out at a temperature of between 0 and −100° C.

8. A process for preparing isobutylene polymers as claimed in claim 7, wherein the polymerisation reaction is carried out in the presence of chain transfer agents.

9. A process for preparing isobutylene polymers as claimed in claim 4, wherein the preliminary copolymerisation of isobutylene with the triene is carried out using a triene which is either 5-methylhepta-1,3,6-triene or octa-1,3,7-triene.

10. A process for preparing isobutylene polymers as claimed in claim 4, wherein the silylation reaction is carried out in the presence of a catalyst chosen from soluble transition metal compounds, metals in a finely divided state, or peroxides.

11. A process for preparing isobutylene polymers as claimed in claim 4, wherein the silylation reaction is carried out in the presence of an inert solvent.

12. A process for preparing isobutylene polymers as claimed in claim 11, wherein the solvent is preferably chosen from aliphatic or aromatic hydrocarbon derivatives, or ethers.

13. A process for preparing isobutylene polymers as claimed in claim 4, wherein the silylation reaction is carried out at a temperature between ambient temperature and 200° C.

14. A process for preparing isobutylene polymers as claimed in claim 13, wherein the silylation reaction is carried out at a temperature preferably between +50° and +120° C.

15. A process for preparing isobutylene polymers as claimed in claims 4 or 9, wherein the silylation reaction is carried out in the presence of a catalyst preferably constituted by a solution of $H_2PtCl_6.6H_2O$ in alcohol, or by other soluble Pt complexes.

16. A process for preparing isobutylene polymers as claimed in claim 4, wherein the silylation reaction is carried out using as silylating agent a silicon compound preferably chosen from $HSiCl_3$, $HMeSiCl_2$, or silicon alkoxy hydrides.

17. Copolymers of isobutylene and at least one triene, selected from the group of consisting of 1,3,7-octatriene, 5-methyl-1,3,6-heptatriene, hexatriene, dicyclopentadiene and allylcyclopentadiene of molecular weight variable between 1000 and 1,000,000 and cross-linkable under ambient humidity conditions, characterised by the presence of pendant functions of type where R is a bivalent hydrocarbon radical of 3 to 10 carbon atoms R' is a monovalent hydrocarbon radical of 1 to 10 carbon atoms X is halogen, or an alkoxy, alkoxyalkoxy, thioalkoxy, acyloxy, amino, aminoxy, oxime or amide radical n can be zero, 1 or 2 wherein the —S— is linked to a double bond on said triene.

18. A process for preparing isobutylene copolymers as claimed in claim 17 comprising the addition of at least one thiol of the general formula to the unsaturated olefin bond of the isobutylene-polyene copolymer.

19. A process as claimed claim 18, characterised in that the thiol is preferably either γ-mercaptopropyl-trimethoxysilane or γ-mercaptopropyl-triethoxysilane.

20. A copolymer as defined in claim 2 wherein the triene is chosen from 5-methylhepta-1,3,6-triene and octa-1,3,7-triene.

21. A composition as defined in claim 1 which includes condensation catalysts and cross-linking agents.

* * * * *